(12) United States Patent
Hagerman et al.

(10) Patent No.: US 8,682,326 B2
(45) Date of Patent: Mar. 25, 2014

(54) BASE STATION AND METHOD FOR VERTICAL TILT ANTENNA BEAM SWEEPING

(75) Inventors: Bo Hagerman, Tyresö (SE); Karl Molnar, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 684 days.

(21) Appl. No.: 12/342,510

(22) Filed: Dec. 23, 2008

(65) Prior Publication Data

US 2010/0159930 A1    Jun. 24, 2010

(51) Int. Cl.
*H04W 36/00*    (2009.01)
(52) U.S. Cl.
USPC ........... 455/436; 370/329; 370/331; 455/450; 455/452.1; 455/452.2
(58) Field of Classification Search
USPC .............. 455/63.4, 82, 83, 452.2, 561, 562.1, 455/575.7, 25, 436–439, 442, 450, 451, 455/464; 370/328, 329, 331, 332, 333, 334, 370/341
See application file for complete search history.

(56) References Cited

U.S. PATENT DOCUMENTS

| | | | |
|---|---|---|---|
| 2005/0064872 A1* | 3/2005 | Osseiran et al. ........... | 455/452.1 |
| 2006/0120287 A1 | 6/2006 | Foti et al. | |
| 2006/0146755 A1* | 7/2006 | Pan et al. ..................... | 370/334 |
| 2007/0249405 A1* | 10/2007 | Goldberg ................... | 455/562.1 |
| 2008/0261658 A1 | 10/2008 | Jin et al. | |
| 2008/0267063 A1 | 10/2008 | Trigui et al. | |
| 2008/0298486 A1* | 12/2008 | Venturino et al. ............. | 375/260 |
| 2009/0201839 A1* | 8/2009 | Smee et al. .................... | 370/310 |
| 2009/0238128 A1* | 9/2009 | Park et al. ....................... | 370/329 |
| 2010/0112952 A1 | 5/2010 | Molnar et al. | |

OTHER PUBLICATIONS

Ericsson: "IMS implications for notification of loss of signaling bearer; S2-063541" 3GPP TSG-SA WG2 Meeting #55, [Online] Oct. 23, 2006,-Oct. 27, 2006 pp. 1-6, XP002451853 Retrieved from the Internet: URL:http://www.3gpp.org/ftp/tsg_sa/WG2-Arch/TSGS2_55_Busan/Docs/S2063541.zip> [retrieved on Sep. 20, 2007] paragraph [5.4.7.5.] paragraph [5.10.3.0.] paragraph [E. 2.1A. 2.].

Ericsson: "Conclusion to Loss of signaling bearer P-CSCF behaviour; S2-063965" 3GPP TSG-SA WG2 Meeting #55, [Online] Oct. 23, 2006,-Oct. 27, 2006 pp. 1-2, XP002451854 Retrieved from the Internet: URL:http://www.3gpp.org/ftp/tsg_sa/WG2_Arch/TSGS2_55_Busan/Docs/S206396S.zip> [retrieved on Sep. 20, 2007] paragraph [003.] paragraph [7.3.2.].

(Continued)

*Primary Examiner* — Wesley Kim
*Assistant Examiner* — Dinh P Nguyen

(57) ABSTRACT

A base station and method are described herein that vertically sweeps an antenna beam within a cell to improve the signal quality at scheduled times for a user terminal located within a coverage area of the cell. In one embodiment, the method improves a signal quality for a user terminal by: (a) vertically sweeping a beam within a cell coverage area to vary a signal quality at scheduled times for the user terminal located within the cell coverage area; and (b) performing one or more scheduling functions while taking into account variations in the vertical sweep of the antenna beam. For instance, the scheduling function(s) can include a link adaptation function, a resource allocation function, a user admittance/dropping function, a handover function, and/or a hybrid automatic repeat request function.

6 Claims, 7 Drawing Sheets

(56) References Cited

OTHER PUBLICATIONS

ETSI TISPAN: "Telecommunications and Internet converged Services and Protocols for Advanced Networking (TISPAN); NGN Functional Architecture; Network Attachment Sub-System (NASS), E1SI ES 282 004" ETSI Standards, European Telecommunications Standards Institute, Sophia-Antipo, FR, vol. TISPAN, No. VIII, Jun. 2006, pp. 1-34, XP014037128 ISSN: 0000-0001 paragraph [5.4.1.3.].

* cited by examiner

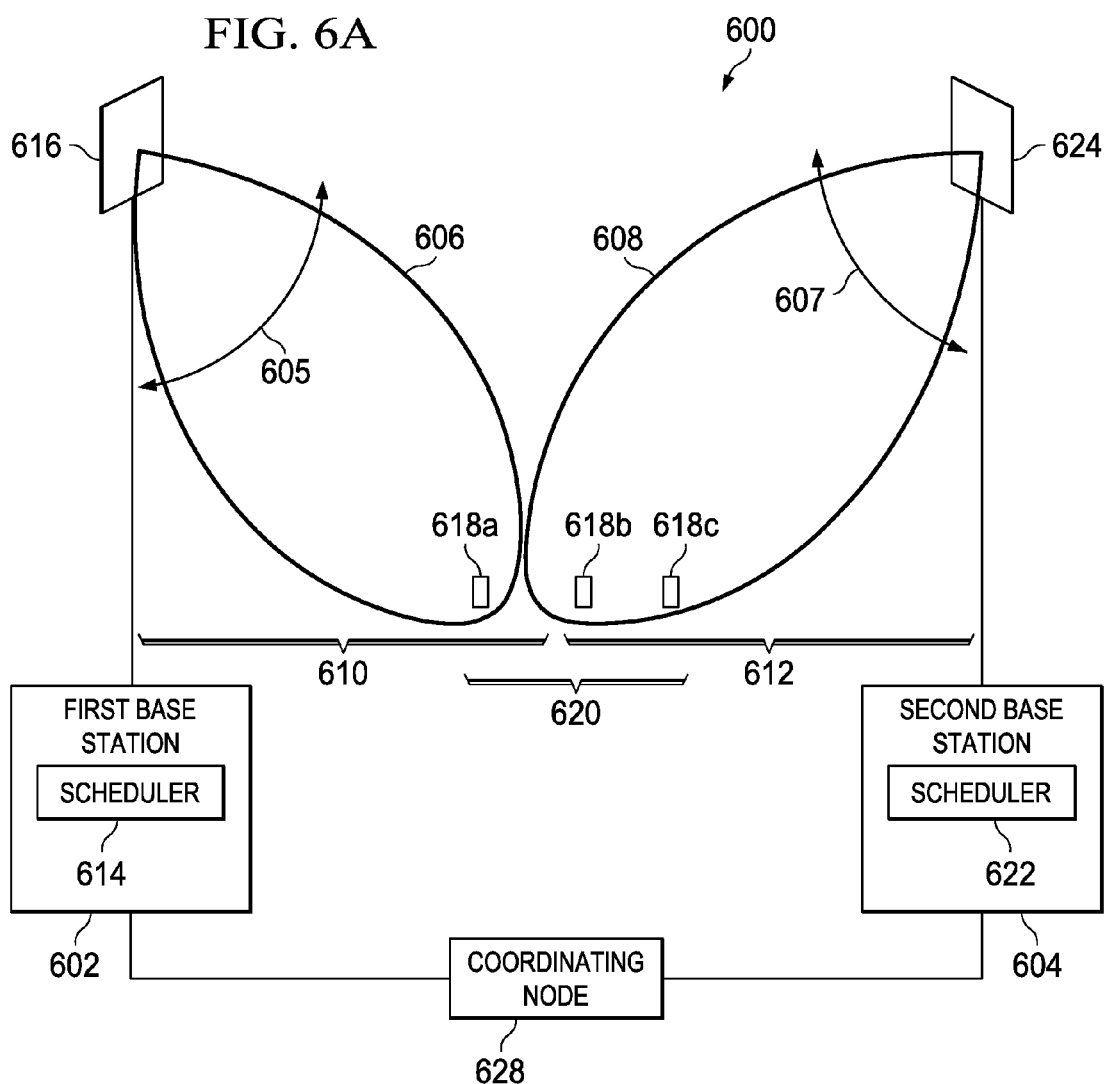

BASE STATION AND METHOD FOR VERTICAL TILT ANTENNA BEAM SWEEPING

TECHNICAL FIELD

The present invention relates in general to the wireless communications field and, in particular, to a base station and method for vertically sweeping an antenna beam within a cell coverage area to improve the signal quality at certain time instances for a user terminal located within the cell coverage area.

BACKGROUND

The following abbreviations are herewith defined, at least some of which are referred to within the following description of the state-of-the-art and the present invention.
  BSC Base Station Controller
  BTS Base Transmission Station
  BFN Node B Frame Number
  C/I Carrier to Interference Ratio (same as SINR)
  CDF Cumulative Distribution Function
  CFN Connection Frame Number
  CQI Channel Quality Information
  E-UTRAN Long Term Evolution UTRAN
  GSM Global System for Mobile Communications
  HARQ Hybrid Automatic Repeat Request
  HSPA High Speed Packet Access
  LTE Long Term Evolution
  MCS Modulation and Coding Scheme
  NBAP Node B Application Protocol
  OFDM Orthogonal Frequency Divisional Multiplexing
  RBS Radio Base Station
  RNC Radio Network Controller
  RFN RNC Frame Number
  SFN System Frame Number
  SINR Signal to Interference Plus Noise Ratio
  TD-SCDMA Time Division-Synchronous Code Division Multiple Access
  UE User Equipment (same as user terminal)
  UTRAN Universal Mobile Telecommunications System Terrestrial Radio Access Network
  WCDMA Wideband Code Division Multiple Access Referring to FIG. 1 (PRIOR ART), there is a block diagram of a traditional wireless communication system 100 that includes two base stations 102 and 104 each of which respectively has an antenna network 106 and 108 which emits a fixed beam 110 and 112 towards multiple user terminals 114a, 114b and 114c. The traditional base stations 102 and 104 are deployed to emit fixed beams 110 and 112 which have vertical tilt angles 116 and 118 that are statically set to provide coverage within their respective cells 120 and 122 to the user terminals 114a, 114b, and 114c. The vertical tilt angles 116 and 118 of the beams 110 and 112 are optimized during the deployment of their antenna networks 106 and 108 to provide sufficient SINRs and to maximize the throughputs of the wireless communication system 100 and/or the multiple user terminals 114a, 114b and 114c.

One problematical issue with this set-up is that the antenna tilt optimization is performed under specific system deployment and traffic assumptions which typically represent the long-term statistics of the environment. As the long-term statistics change from their initial condition, the base stations 102 and 104 can be re-evaluated and parameters including the vertical tilt angles 116 and 118 of beams 110 and 112 can be updated to reflect new traffic assumptions which represent the new long-term statistics of the environment which are currently in effect. However, setting system parameters based on the long-term statistics may be somewhat inefficient in that the parameters are likely to be mismatched in the short term to the environment (e.g., not account for quick changes in user traffic).

Another problematic issue with this set-up is that the base stations 102 and 104 emit beams 110 and 112 which have a uniform elevation pattern that does not help the user terminals 114 (e.g., user terminal 114b) located at an edge 124 of their respective cells 120 and 122 and may be affected more by interference. FIG. 1 helps illustrate this problematical issue where the vertical elevations of the beams 110 and 112 are set so their beam patterns extend to the edge 124 for two cells 120 and 122. In this example, the cell-edge user terminal 114b would suffer from interference caused by the user terminal 114c in the neighboring cell 122.

Yet another problematic issue with this set-up is that the base stations 102 and 104 have a static antenna deployment and this induces a certain SINR distribution that corresponds to a specific geographical area, but it does not necessarily reflect the distribution of the user terminals 114a, 114b and 114c within that specific geographical area. For example, consider the signal levels 202 (desired path gain 202) for user terminals 114a and 114b (for example) within cell 120 and the noise plus interference levels 204 (interfering path gain 204) from user terminals 114c (for example) within cell 122 shown in the plot of FIG. 2 (PRIOR ART). In this plot, the desired cell 120 is assumed to have a 1500 m radius and the letter "D" in the legend means desired while the letter "I" in the legend means interfering. Both path gains 202 and 204 are plotted as a function of distance from the center of the desired cell 120 where the center is associated with the first base station 102. In both the desired and interfering cells 120 and 122, the antenna networks 106 and 108 respectively emit beams 110 and 112 with a static vertical tilt angle 116 and 118 which is 5 degrees while their elevation half-power beamwidth is 3 degrees. A noise floor of −125 dB is assumed and multiple user terminals 114 are drawn uniformly and randomly and then placed within the cells 120 and 122. FIG. 3 (PRIOR ART) is a plot that shows the SINR 302 for the path gain 202 realizations as a function of distance from the first base station 102. Additionally, FIG. 4 (PRIOR ART) shows a CDF 402 of this SINR 302 for all user terminals 114 whose distance is 1500 m or less from the desired first base station 102. From these three plots, the following conclusions can be observed:

User terminals 114b (for example) located close to the cell edge 124 have low SINR 302 values and are located in the low range of the CDF 402.
  Assuming a uniform distribution of user terminals 114 in the cell 120, the greatest number of user terminals 114 will be located or positioned in the outer area of the cell 120. Hence, these user terminals 114 will likely have low SINR 302 values and be located in the low range of the CDF 402.
  The dip in path gain 202 and SINR 302 for user terminals 114 which are located closer to the base station 102 is due to beam elevation grating lobes, which can typically be handled by using a null-fill in the design of the antenna network 106 or by using an auxiliary beam with a low signal strength which fills in the area. As can be seen, the dip in the path gain 202 and SINR 302 of these plots is not due to interference or noise effects.

In view of the foregoing, it can be appreciated that there has been and still is a need to address the aforementioned problematical issues and other problematical issues associated with the traditional base stations 102 and 104 that emit beams 110 and 112 which have statically set vertical tilt angles 116 and 118. These needs and other needs are satisfied by the present invention.

SUMMARY

In one aspect, the present invention provides a base station that includes an antenna system that vertically sweeps an antenna beam within a cell coverage area to vary a signal quality at scheduled times for a user terminal located within the cell coverage area, and a scheduler that performs a scheduling function while taking into account variations in the vertical sweep of the antenna beam. The scheduler can perform one or more scheduling functions such as, for example, a link adaptation function, a resource allocation function, a user admittance/dropping function, a handover function, and a hybrid automatic repeat request function. This a marked improvement over the prior art since rather than utilizing a static vertical antenna tilting it vertically sweeps the beam within a desired range in a cell coverage area which introduces a signal strength (e.g., SINR) distribution that varies over time and/or geography so that larger SINR dynamics are achieved which improves the signal quality at specific times for the user terminal(s) located within the cell coverage area.

In another aspect, the present invention provides a method for improving a signal quality for a user terminal by: (a) vertically sweeping a beam within a cell coverage area to vary a signal quality at scheduled times for the user terminal located within the cell coverage area; and (b) performing one or more scheduling functions while taking into account variations in the vertical sweep of the antenna beam. For instance, the scheduling function(s) can include a link adaptation function, a resource allocation function, a user admittance/dropping function, a handover function, and/or a hybrid automatic repeat request function. This a marked improvement over the prior art since rather than utilizing a static vertical antenna tilting it vertically sweeps the beam within a desired range in a cell coverage area which introduces a signal strength (e.g., SINR) distribution that varies over time and/or geography so that larger SINR dynamics are achieved which improves the signal quality for the user terminal(s) located within the cell coverage area.

In yet another aspect, the present invention provides a wireless communication system that includes a first base station and a second base station, wherein the first base station includes a first scheduler and a first antenna system that vertically sweeps a first beam within a first cell to improve a signal quality at scheduled times for a first user terminal located within a coverage area of the first cell, and wherein the second base station includes a second scheduler and a second antenna system that vertically sweeps a second beam within a second cell to improve a signal quality at scheduled times for a second user terminal located within a coverage area of the second cell. This a marked improvement over the prior art since rather than utilizing a static vertical antenna tilting it vertically sweeps the beam within a desired range in the cells which introduces a signal strength (e.g., SINR) distribution that varies over time and/or geography so that larger SINR dynamics are achieved which improves the signal quality for the user terminal(s) located within the coverage areas of the cells.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 6A-6B are block diagrams of an exemplary multi-cell wireless communication system that includes two base stations each of which vertically sweep their respective beams within their respective cells in accordance with an embodiment of the present invention.

DETAILED DESCRIPTION

Figure 5:
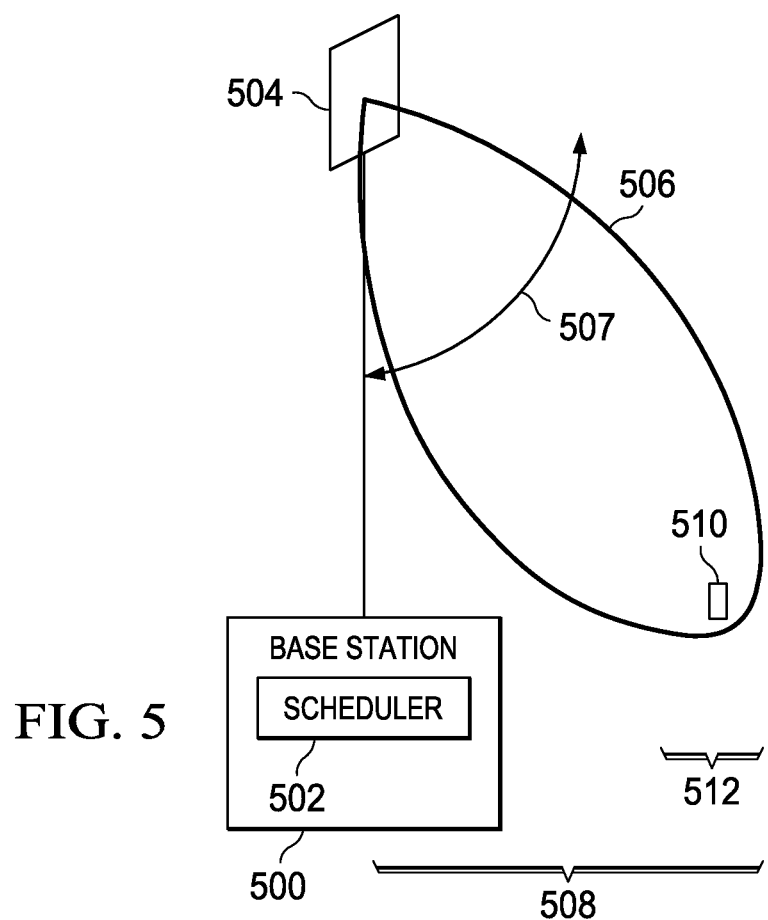
FIG. 5 is a block diagram of an exemplary base station which vertically sweeps an antenna beam within a cell in accordance with an embodiment of the present invention.

Referring to FIG. 5, there is a block diagram illustrating a base station 500 that is configured in accordance with an embodiment of the present invention. The base station 500 includes a scheduler 502 and an antenna system 504 (more possible) that vertically sweeps a beam 506 within a cell 508 to improve a signal quality (e.g., SINR) at certain time instances for one or more user terminals 510 (one shown) located within a coverage area of the cell 508. This a marked improvement over the prior art since rather than utilizing a static vertical antenna tilting the beam 506 is vertically swept within a desired range 507 which introduces a signal strength (e.g., SINR) distribution that varies over time and/or geography so that larger SINR dynamics are achieved in coverage area of the cell 508 (see FIGS. 6A-6B). The scheduler 502 makes beneficial use of the larger signal strength (e.g., SINR) dynamics by taking into account the variations in the vertical sweep of the beam 506 to determine when the signal strength (e.g., SINR) is high and low within the coverage area of cell 508. Then, the scheduler 502 uses the determined signal strengths (e.g., SINR) when performing a scheduling function that includes at least one of a link adaptation function, a resource allocation function, a handover function, a user admittance/dropping function, and/or a HARQ function. Basically, the scheduler 502 can use the created good SINR locations caused by the larger signal strength (e.g., SINR) dynamics to improve at least one of the aforementioned scheduling functions. Each of these improved scheduling functions are briefly explained next:

Link Adaptation Function: The link adaptation process selects modulation and coding schemes for the user terminal 510 based on the determined SINRs. While the SINR levels will vary for all of the user terminals 510 located throughout the cell 508, the greatest impact will be to improve the throughput for the worst-case user terminal 510 which is located near the cell edge 512.

Resource Allocation Function: The resource allocation function can assign specific physical resources such as sub-carriers, resource blocks or time slots in an OFDM system, or spreading codes in a CDMA system to the user terminal 510 based on the determined SINRs. The user terminal 510 utilizes the assigned physical resources when transmitting signals or receiving signals from the antenna system 504 associated with the base station 500.

Handover Function: The handover function can assign handover resources to one or more user terminals 510 and designate one or more user terminals 510 to make handover measurements based on the determined SINRs.

User Admittance/Dropping: The user admittance/dropping function can admit a new user terminal 510 into the cell 508 and/or drop an existing user terminal 510 from the cell 508 based on the determined SINRs.

HARQ Function: The HARQ process can reschedule retransmissions to the user terminal 510 based on the determined SINRs. For instance, the scheduler 502 can reschedule retransmissions to the user terminal 510 when it is located in an area that has the scheduled good SINRs. In this way, the HARQ process can be improved to help to average out the undesirable beam tilt positions. For example, if it is known that a retransmission is required and the user terminal 510 will be in a position where it is going to experience a better (worse), then the base station 500 (scheduler 502) might adjust the timing of the retransmission accordingly, or perhaps modify the retransmission parameters to increase the probability that the retransmission will succeed.

In the single-cell environment, the changing of the vertical tilt angle 507 of the beam 506 improves the desired (own) cell signal strength (e.g., SINR) at certain time instants. Thus, the average throughput for the user terminal 510 located in the coverage area of cell 508 is improved over time with the varying antenna tilt patterns. In particular, a cell edge user terminal 510 will benefit from more advantageous signal strengths (e.g., SINRs) at scheduled times. However, another aspect of the present invention is the ability to reduce interference from neighboring cells. In multi-cell systems, vertical beam tilting can be used in each cell to reduce interference from neighboring cells. A detailed discussion is provided next about an exemplary multi-cell wireless communication system 600 which is configured in accordance with an embodiment of the present invention.

Figure 6B:
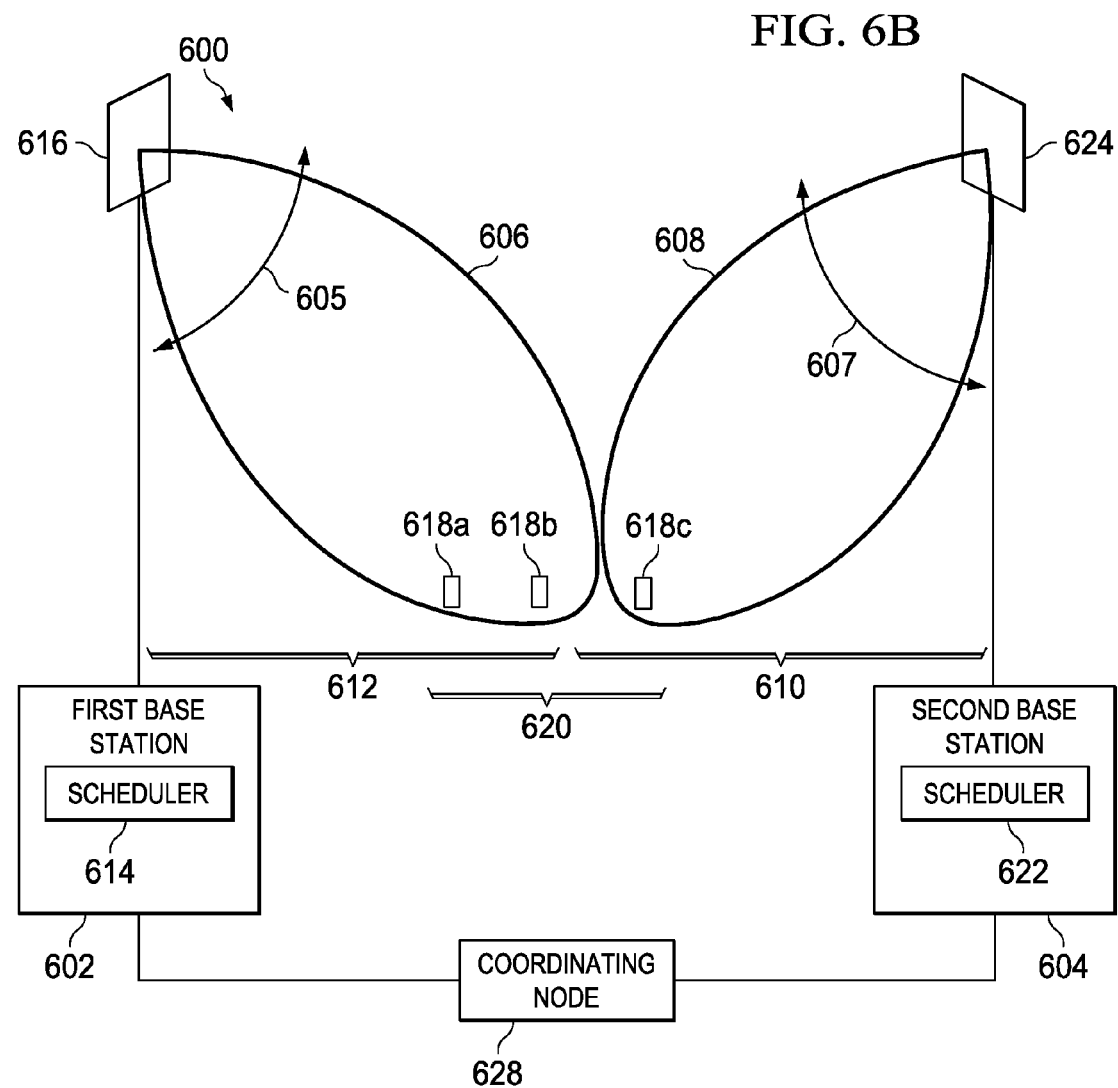

Referring to FIGS. 6A and 6B, there are two block diagrams of an exemplary multi-cell wireless communication system 600 that includes two base stations 602 and 604 each of which vertically sweep their respective beams 606 and 608 during a specified time period within their respective cells 610 and 612 in accordance with an embodiment of the present invention. The first base station 602 includes a scheduler 614 and at least one antenna system 616 that vertically sweeps the beam 606 through a desired range 605 within cell 610 to improve a signal quality (e.g., SINR) at certain time instances for one or more user terminals 618a and 618b (for example) located at an overlapping coverage area 620 of the cells 610 and 612. The second base station 604 includes a scheduler 622 and at least one antenna system 624 that vertically sweeps the beam 608 through a desired range 607 within cell 612 to improve a signal quality (e.g., SINR) at certain time instances for one or more user terminals 618b and 618c (for example) located within the overlapping coverage area 620 of the cells 610 and 612. The wireless communication system 600 would typically have a large number of base stations that are configured like base stations 602 and 604 but for clarity those additional base stations along with well-known components and methods have not been described herein so as not to obscure the description of the present invention.

The wireless communication system 600 may be configured such that the vertical tilt sweeping patterns of the beams 606 and 608 are uncoordinated between the cells 610 and 612. The uncoordinated vertical tilt sweeping of beams 606 and 608 provides varying signal strength distributions (e.g., SINR distributions) but these distributions may not be predictable (i.e. the SINR changes may not be static time predicted). However, the base station 602 (scheduler 614) can have functionality that dynamically monitors and learns the vertical tilt sweeping pattern of the beam 608 in the neighboring cell 612. The base station 604 (scheduler 622) can also have functionality that dynamically monitors and learns the vertical tilt sweeping pattern of the beam 606 in the neighboring cell 610. The base stations 602 and 604 (schedulers 614 and 622) are assumed to know the vertical tilt sweeping patterns of their respective beams 606 and 608 within their own cells 610 and 612. The base stations 602 and 604 (schedulers 614 and 622) can utilize this information to find the occurrences of both high desired signal levels and low interference levels in cells 610 and 612. Then, the base stations 602 and 604 (schedulers 614 and 622) can use this information in a semi-static or temporary manner to improve one or more of the scheduling functions namely a link adaptation function, a resource allocation function, a handover function, a user admittance/dropping function, and/or a HARQ function.

Alternatively, the wireless communication system 600 may also include a coordinating node 628 which coordinates the vertical sweeps of the beams 606 and 608 emitted from the base stations 602 and 604. The coordinated vertical tilt sweeping of beams 606 and 608 can be used to guarantee that occurrences of high desired signal levels and low interference levels in both cells 610 and 612 will be achieved. FIGS. 6A and 6B illustrate this desirable feature by showing snapshots of the patterns of beams 606 and 608 with different vertical tilt angles at two different times as they are being swept within cells 610 and 612. In particular, FIG. 6A shows a situation where base station 604 has an improved signal quality while FIG. 6B shows a situation where base station 602 has an improved signal quality. The base stations 602 and 604 (schedulers 614 and 622) can use these predictable time instants of improved signal quality to improve the performance of at least one of the aforementioned scheduling functions. This is more advantageous than the uncoordinated vertical tilt sweeping where the scheduling functions would be more challenging. Further, the base stations 602 and 604 (schedulers 614 and 622) can optimize in a static or an adaptive fashion the coordinated vertical tilt sweeping of beams 606 and 608 in cells 610 and 612 according to one or more of their conditions including, for example, their respective traffic, environment, changed network deployment, total throughput, and user distributions.

As described above, when the antenna tilt angle is varied in some known pattern then the signal strength (e.g., SINR) will also vary for a user terminal 618a, 618b and 618c located in a stationary position. Each base station 602 and 604 (scheduler 614 and 622) can take this information into account to improve the scheduling of new user terminals in the future, the link adaptation process, the handover process, the user admittance/dropping process, and/or the HARQ process. In particular, for each base station 602 and 604 (scheduler 614 and 622) to take advantage of the vertical tilt beam sweeping they should know, predict or be able to estimate the pattern variations of both beams 606 and 608. In this way, each base stations 602 and 604 (scheduler 614 and 622) is able to take into account the pattern variations in beams 606 and 608 to take advantage of the larger SINR variance (increased dynamics) and subsequently improve the link adaptation process, the user scheduling process and/or the HARQ process.

In the above described single-cell environment, the tilt angle of the beam 506 may be varied within a single cell 508, which may be useful for situations where cell-edge interference is not the limiting performance issue. However, in the multi-cell wireless communication system 600, the variation of the vertical tilt angle patterns of beams 606 and 608 may be coordinated by the coordinating node 628 to affect an overall gain in system performance. In this situation, the following should be considered:

- The antenna tilt pattern should be developed not only for a single cell 610, but for more than one cell 610 and 612 (only two shown). Thus, an inter-site pattern should be developed.
- The base stations 602 and 604 (schedulers 614 and 622) have knowledge of their own antenna tilt pattern and the antenna tilt pattern(s) of their neighboring cells 610 and 612. Alternatively, the base stations 602 and 604 (schedulers 614 and 622) can estimate or in effect learn this beam information.
- The base stations 602 and 604 (schedulers 614 and 622) may not be required to know or estimate the antenna tilt patterns within cells 610 and 612. Rather, the base stations 602 and 604 (schedulers 614 and 622) could know that the signal strength (e.g., SINR) varies and how it varies at key points within cells 610 and 612. This could be, for example, measured from the uplink transmissions from user terminals 618a, 618b and 618c that have positioning capabilities. Alternatively, the user terminals 618a, 618b and 618c may facilitate this by measuring signal strength (e.g., SINR) and then using CQI messages to report this information back to the base stations 602 and 604 (schedulers 614 and 622).
- The coordinated swept vertical tilt patterns of beams 606 and 608 can be implemented to handle different user traffic scenarios. For example, hot spot user scenarios may exist that requires a vertical tilt pattern to focus for a higher percentage of the time over the hot spot so that on average a higher signal strength (e.g., SINR) is realized over the hot spot area. This could be compared to a scenario where there are no hot spots and a more uniform vertical tilt pattern can be designed to realize an equitable distribution of the signal strength (e.g., SINR) over the coverage area.

The coordinating node 628 can align the vertical tilt patterns of beams 606 and 608 between the base stations 602 and 604 by signaling the necessary information to them so that they can perform and coordinate their respective vertical tilt patterns. In one example, the coordinating node 628 may signal coordination information which includes: (1) the type of beam pattern and duration of sweeping as a function of time to be used for the respective beam; (2) a trigger time to start the sweep; and (3) a time-reference for the trigger time. This information is described further below:

- The beam pattern can be specified, for example, as a sequence of nominal beam-pointing angles which implicitly includes the duration of the beam pattern. Alternatively, the beam pattern could be specified as a sequence of beam weights for a specific antenna array design. Additionally, to define the beam pattern a subset of predefined sweep functions may be specified along with a pointer to use out of a predefined list stored in the base stations 602 and 604 (schedulers 614 and 622).
- The start trigger time can be specified, either as a relative time with respect to RFN, BFN, or CFN timing references, or against an absolute clock or some other equivalent timer reference value-pointer.

The above coordination information should be signaled through the entire network 600 or to a subset of the network 600 (set of cells). In one embodiment, the coordinating node 628 (or some other device) can perform this by broadcasting the coordination information (e.g. the pattern information, trigger time, and time reference). Alternatively, a subset of the coordination information could be stored by the base stations 602 and 604 via an initial broadcast or other setup means and the remaining coordination information could then be signaled at the appropriate time by the coordinating node 628 to the base stations 620 and 604. For example, a list of default vertical sweep functions could be initially stored by the base stations 602 and 604, and then an index pointer and the trigger timing information could be broadcast at the appropriate time by the coordinating node 628 (or some other device). In another embodiment, the coordinating node 628 (or some other device) could use cell specific signaling to transmit the information to a single base station 602 (for example) or a subset of base stations 602 and 604 (for example) directly without using a broadcast mechanism. It should be appreciated that base stations 602 and 604 and any other base stations which are part of the network may have multiple antenna systems and multiple cells. Moreover, the coordinating node 628 may be located at anyone of the base stations 602 and 604.

These different signaling approaches all act in a manner that globally coordinates the vertical tilt patterns of beams 606 and 608 (more possible) within cells 610 and 612 (more possible) associated with the base stations 602 and 604 (more possible). With the broadcast signaling, the vertical tilt patterns of beams 606 and 608 may be coordinated by the coordinating node 628 via their start trigger times so that neighboring cells 610 and 612 have tilt patterns which are aligned with respect to their coordinated trigger times. Alternatively, the vertical tilt patterns of beams 606 and 608 may be coordinated by having the coordinating node 628 select a different tilt pattern for each cell 610 and 612 from a list of tilt patterns. In this case the vertical tilt pattern for each cell 610 and 612 is required to be signaled, or some other mechanism is required to specify the vertical tilt pattern for each cell 610 and 612. One such approach would be to broadcast one vertical tilt pattern index from a list of tilt patterns and then each base station 602 and 604 chooses an index to this list that is a circular offset from the broadcast index value. For example, the circular offset could be configured during cell setup or could be determined from the cell identification number.

In yet another embodiment, local coordination between sub-parts of the wireless communication system 600 may be used in place of (or in addition to) the global coordination that was described above. Consequently, the local coordination can be performed between several base stations 602 and 604 (selected from multiple base stations) for individual subsets of cells 610 and 612, and coordination messages can also be signaled between the coordinated base stations 602 and 604. In addition, for optimization purposes (e.g., in scheduling), the local signaling of vertical sweep functions and start trigger times used by neighboring cells 610 and 612 can be signaled in a list to each base station 602 and 604 (e.g., like the neighbor list for handover measurements used in traditional wireless communication systems).

Depending on the type of the wireless communication system 600 this coordination and signaling would be performed on various interfaces by potentially different nodes. Several different types of wireless communication systems 600 and there different nodes are discussed next:

In a GSM wireless communication system 600, the overall coordinating node 628 is a BSC which has a coordination feature/functionality that could signal the vertical tilt pattern information to BTSs (which correspond to base stations 602 and 604) using messages over an Abis interface.

In an UTRAN (e.g., WCDMA/HSPA/TD-SCDMA) wireless communication system 600, the coordinating node 628 is a RNC which has a coordination feature/functionality that could signal the vertical tilt pattern information to NodeBs/RBSs (which correspond to base stations 602 and 604) over a NBAP interface.

In an E-UTRAN (LTE, LTE-Advance) wireless communication system 600, the coordinating node 628 is an eNodeB which can handle up to 256 intra eNodeB cells (which correspond to base stations 602 and 604). The vertical tilt pattern information could be signaled using inter eNodeB coordination messages that are transmitted from the eNodeB over an X2 interface to the intra eNodeB cells.

Figure 1:
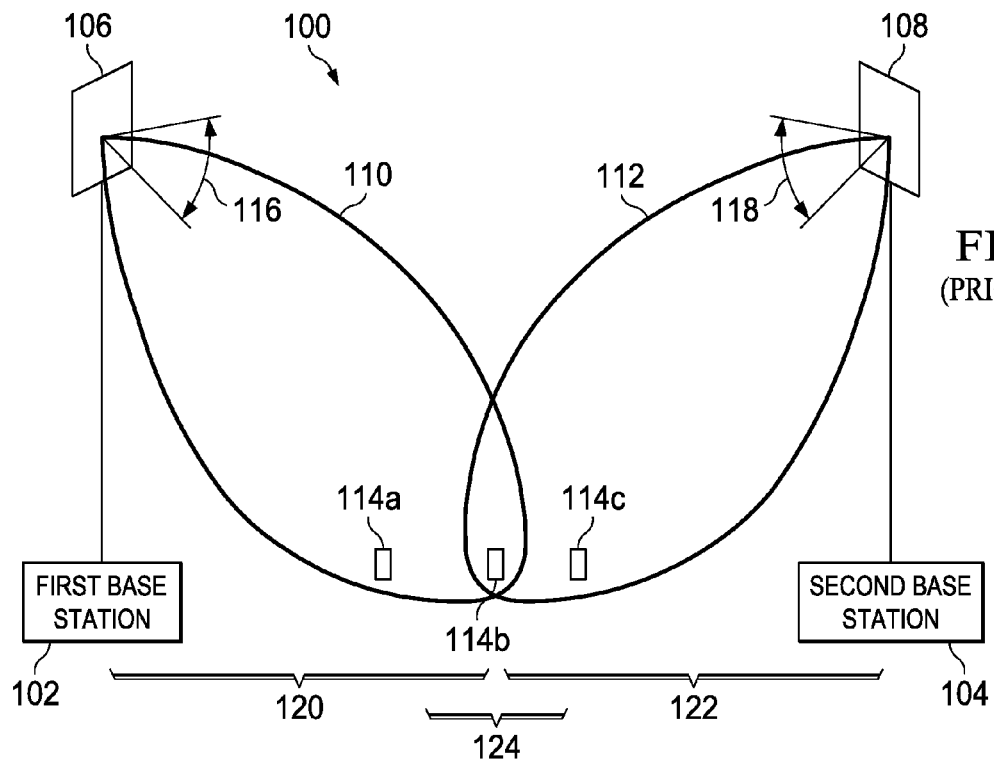
FIGS. 1-4 (PRIOR ART) respectively illustrate a block diagram of traditional wireless communication system (including traditional base stations) and several simulation plots which are used to help explain problems which are addressed by the present invention.
Figure 2:
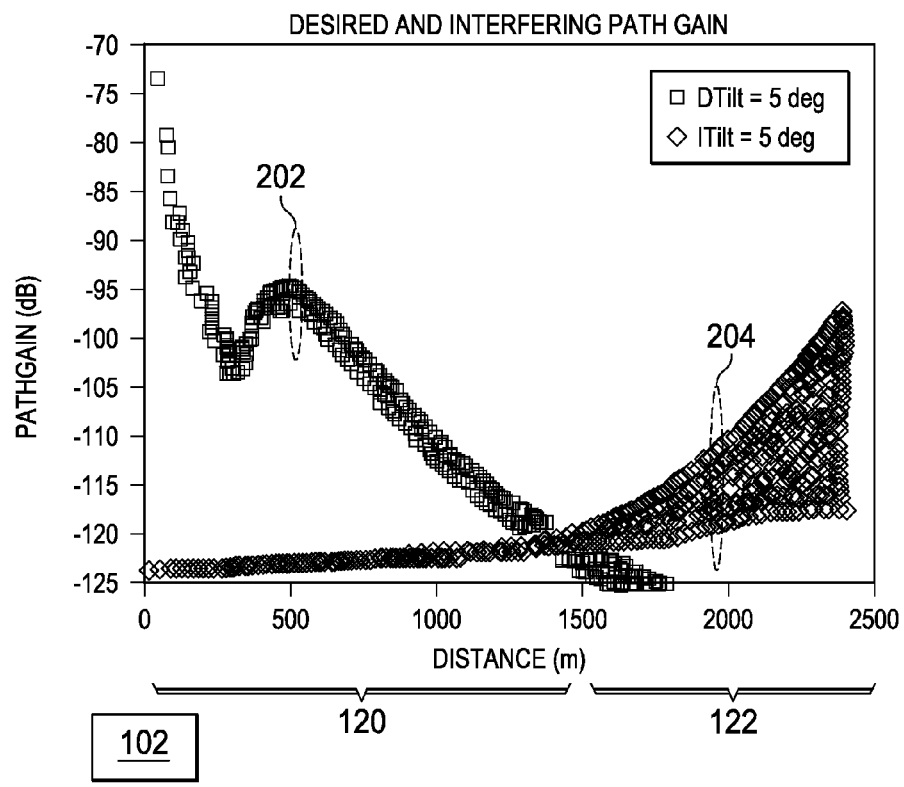
Figure 3:
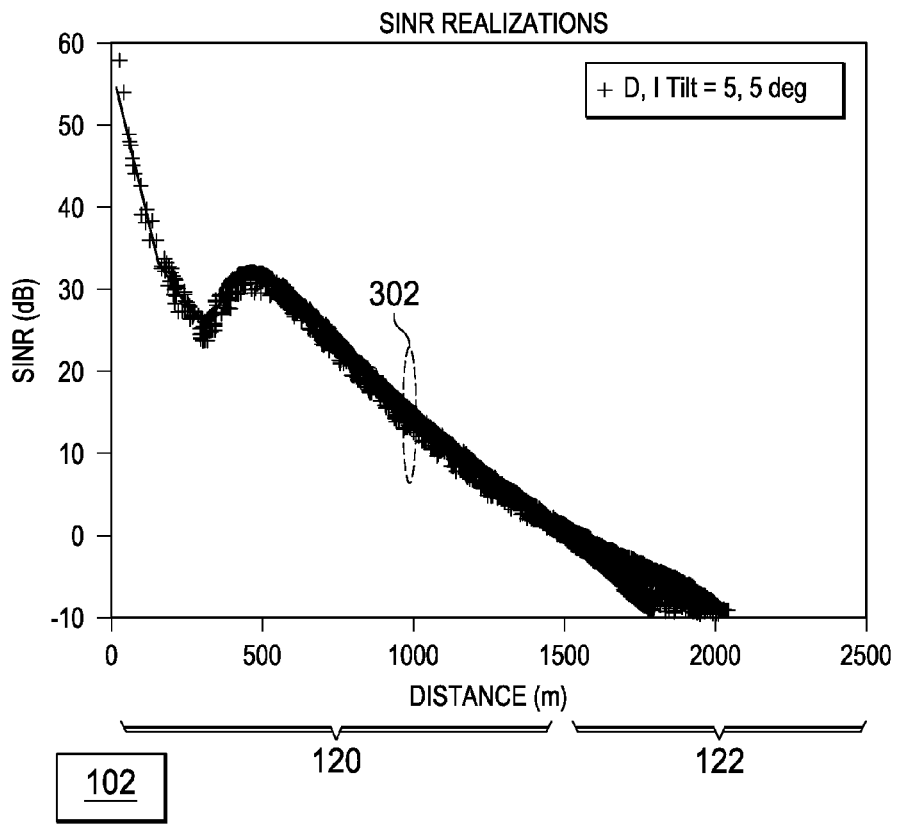
Figure 4:
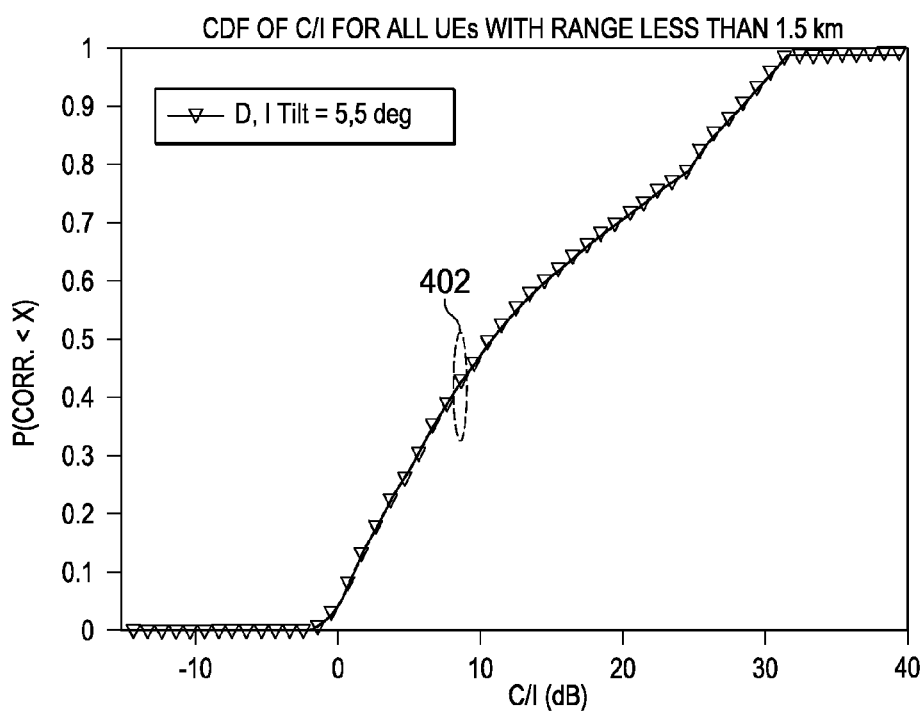
Figure 7:
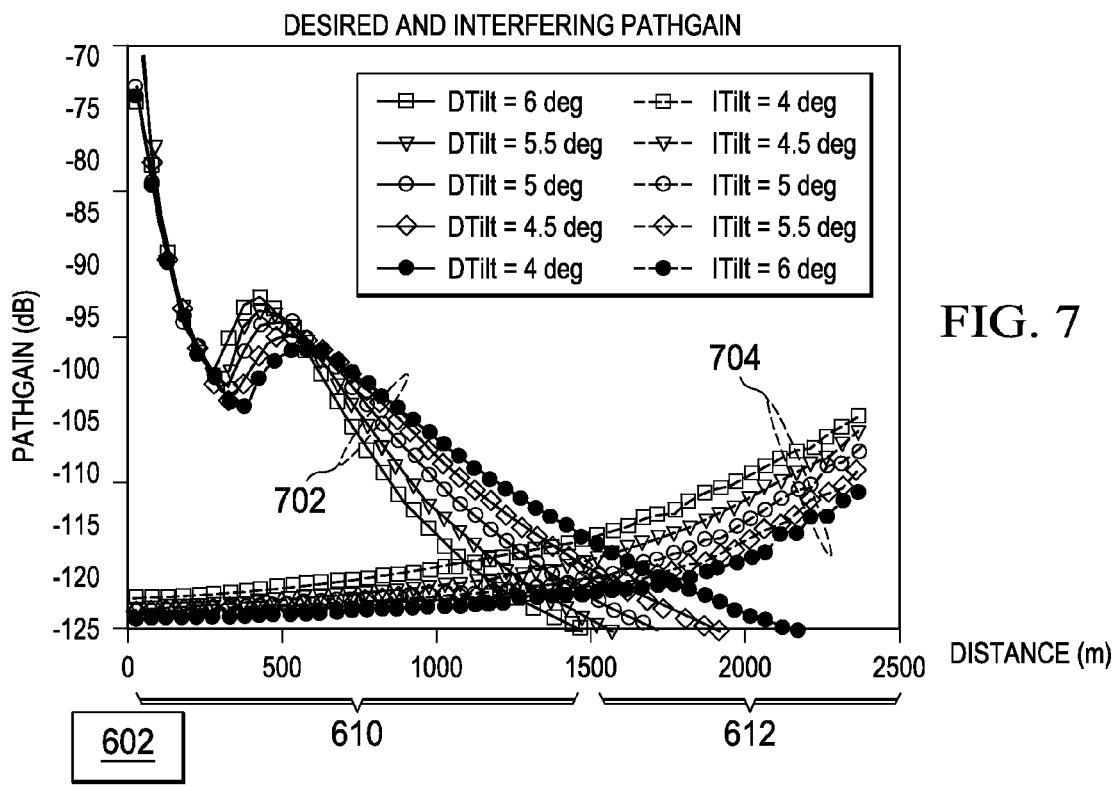
FIGS. 7-10 are simulation plots that illustrate some of the different advantages that can be obtained when a base station vertically sweeps an antenna beam within a cell in accordance with an embodiment of the present invention.
Figure 8:
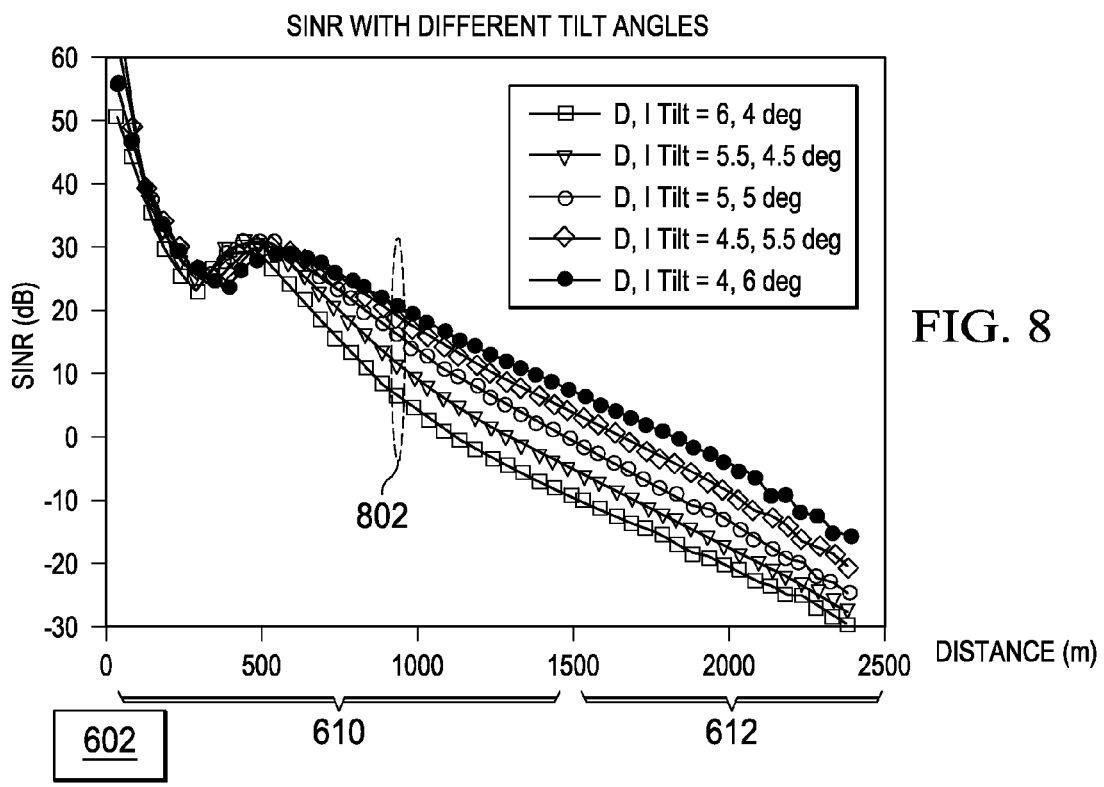

The inventors have conducted simulation tests to illustrate some of the different advantages that can be obtained when implementing the present invention. In these tests, the vertical angles of the beams 606 and 608 (for example) had been tilted in some predictable manner and, as a result, the desired signal and interference path gains had been made to vary along with the SINR levels that are observed at user terminals 618a, 618b and 618c (for example). Referring to FIG. 7, there is a plot that shows the variation in the signal levels 702 (desired path gain 702) for user terminals 618a and 618b (for example) within cell 610 and the noise plus interference levels 704 (interfering path gain 704) from user terminal 618c (for example) within cell 612 when the antenna tilt angle of beams 606 and 608 varied from 4 to 6 degrees (note: a four degree tilt angle points the beam farther from the base station 602 and 604) (compare to FIG. 2). FIG. 8 is a plot that shows the SINRs 802 for the realized path gain 702 as a function of distance from the first base station 602. The lines in this plot are coded the same as the pair of path gains 702 and 704. Plus, in these plots the letter "D" in the legend means desired and the letter "I" in the legend means interfering. In both FIGS. 7-8, the mean path gains 702 and 704 and the mean SINRs 802 are plotted while the instantaneous values vary about the mean. As can be seen in these plots, by varying the beam vertical tilt angles overtime, a series of SINR distributions is created, with one specific distribution at any one snapshot in time. These distributions can be made to vary over time so that user terminals 618a, 618b and 618c at the edges of cells 610 and 612 experience advantageous conditions so good user throughputs can be achieved at those time known instants.

Figure 9:
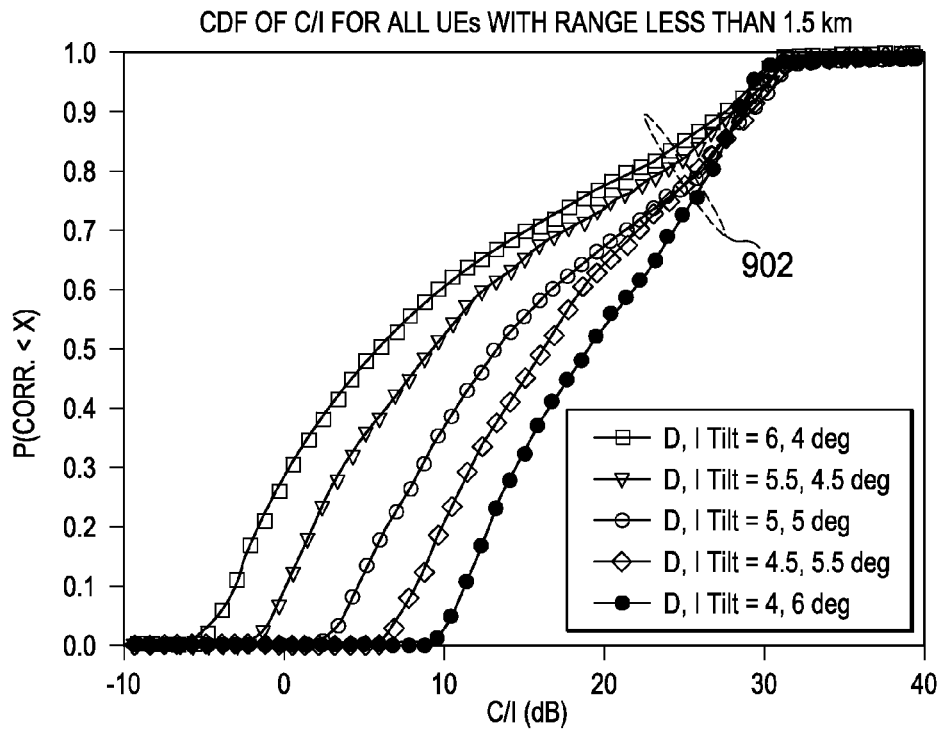
Figure 10:
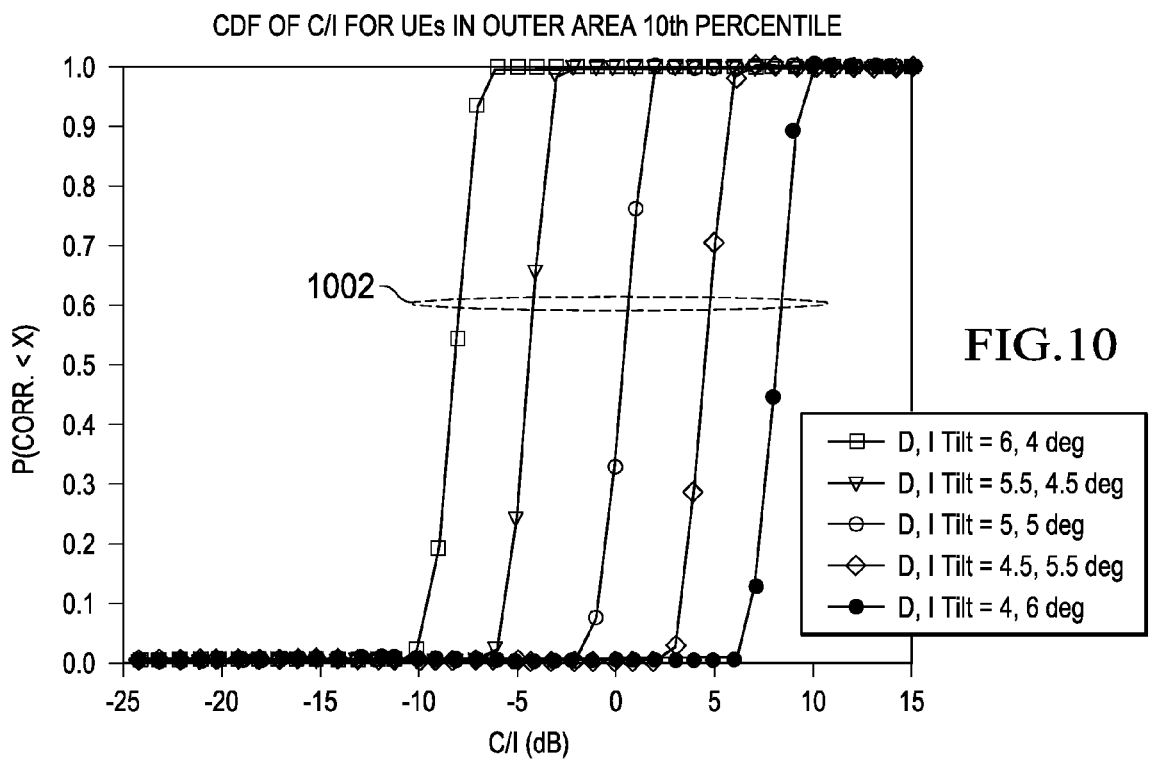

Referring to FIG. 9, there is another plot which shows the SINR distributions 802 as a CDF 902 for the different antenna tilt angles used in the plots of FIGS. 7-8. This plot shows the CDF 902 for all user terminals 618a and 618b (for example) within a distance that is less than 1500 m from the base station 602 (for example). As can be seen, the CDF 902 varies for user terminals 618a and 618b (for example) which have a low SINR. FIG. 10 is a plot which shows the CDF 1002 of the SINR for all the user terminals 618a and 618b (for example) in the $10^{th}$ percentile farthest in area from the base station 602 (for example), which confirms that varying the antenna tilt angle changes the CDF for the low-SINR user terminals 618a and 618b at the edge 620 of the cell 610.

The following is a list of some additional advantages associated with the present invention:

Low SINR, cell-edge user terminals are primarily targeted for performance improvement by the present invention. Plus, the user terminals located in the remainder of the cell coverage area will also experience improved SINRs due to the present invention.

The use of time-varying vertical antenna tilt patterns creates a larger variance in the SINR distribution so that better SINRs are realized and can be taken advantage of by various functions such as user scheduling, link adaptation, resource allocation, handover, user admittance/dropping, and/or HARQ.

The scheduler can be more aggressive with higher rate targets, trusting that HARQ will help overcome bad situations.

The overall capacity of the wireless communication system is improved when the vertical tilting is combined with user scheduling. Plus, the wireless communication system rather than being designed to be matched to the long-term statistics (e.g., a static environment) can now be designed to match and exploit the short-term statistics of the environment.

If desired, the present invention can also be implemented with the horizontal tilting of antenna beams as was described in a co-assigned U.S. patent application Ser. No. 12/262,724 filed on Oct. 31, 2008 and entitled "Base Station and Method for Improving Coverage in a Wireless Communication System using Antenna Beam-Jitter and CQI Correction". The contents of this document are hereby incorporated by reference herein.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as has been set forth and defined by the following claims.

The invention claimed is:

1. A base station, comprising:
a scheduler;
an antenna system that vertically sweeps an antenna beam within a cell coverage area to vary a signal quality at scheduled times for a user terminal located within the cell coverage area;
said scheduler estimating a signal strength within the cell coverage area based on variations in the vertical sweep of the antenna beam, and performing a scheduling function based on the estimated signal strength;
where the scheduler performs at least two of following scheduling functions: a link adaptation function, a resource allocation function, a user admittance/dropping function, a handover function, and a hybrid automatic repeat request function;
where the scheduler performs the link adaptation function while taking into account the variations in the vertical sweep of the antenna beam when selecting a modulation and coding scheme to utilize for the user terminal;
where the scheduler performs the resource allocation function while taking into account the variations in the vertical sweep of the antenna beam when allocating resources used for transmitting signals to or receiving signals from the user terminal;
where the scheduler performs the user admittance/dropping function while taking into account the variations in the vertical sweep of the antenna beam when admitting or dropping one or more user terminals which are located in the coverage area;
where the scheduler performs the handover function while taking into account the variations in the vertical sweep of the antenna beam when assign handover resources to one or more user terminals and designating one or more user terminals to make handover measurements; and where the scheduler performs the hybrid automatic repeat request function while taking into account the variations in the vertical sweep of the antenna beam when rescheduling retransmissions to the user terminal.

2. The base station of claim 1, wherein the scheduler performs the scheduling function while taking into account channel quality information received from the user terminal.

3. A wireless communication system, comprising:
a first base station including:
a first scheduler; and
a first antenna system that vertically sweeps a first beam within a first cell to improve a signal quality at scheduled times for a first user terminal located within a coverage area of the first cell; and
a second base station including:
a second scheduler; and
a second antenna system that vertically sweeps a second beam within a second cell to improve a signal quality at scheduled times for a second user terminal located within a coverage area of the second cell;
said first scheduler estimates a first signal strength within the first cell based on variations in the vertical sweep of the first beam, and performs a first scheduling function based on the estimated first signal strength;
said second scheduler estimates a second signal strength within the second cell based on variations in the vertical sweep of the second beam, and performs a second scheduling function based on the estimated second signal strength;
wherein the first base station and the second base station are uncoordinated with regards to the vertical sweeping of the first beam and the second beam;
wherein the first base station predicts/estimates the vertical sweeping of the second beam to determine instances when the signal strength is high and low within an edge of the second cell;
the first scheduler utilizes the estimated first signal strength within the first cell and the determined instances when the signal strength is high and low within an edge of the second cell to find occurrences of both high desired signal levels and low interference levels in the first and second cells;
the first scheduler utilizes the occurrences of both high desired signal levels and low interference levels in the first and second cells in a semi-static or temporary manner to improve the first scheduling function;
wherein the second base station predicts/estimates the vertical sweeping of the first beam to determine instances when the signal strength is high and low within an edge of the first cell;
the second scheduler utilizes the estimated second signal strength within the second cell and the determined instances when the signal strength is high and low within an edge of the first cell to find occurrences of both high desired signal levels and low interference levels in the first and second cells; and
the second scheduler utilizes the occurrences of both high desired signal levels and low interference levels in the first and second cells in a semi-static or temporary manner to improve the second scheduling function.

4. A wireless communication system, comprising:
a first base station including:
a first scheduler; and
a first antenna system that vertically sweeps a first beam within a first cell to improve a signal quality at scheduled times for a first user terminal located within a coverage area of the first cell; and
a second base station including:
a second scheduler; and
a second antenna system that vertically sweeps a second beam within a second cell to improve a signal quality at scheduled times for a second user terminal located within a coverage area of the second cell;
said first scheduler estimates a first signal strength within the first cell based on variations in the vertical sweep of the first beam, and performs a first scheduling function based on the estimated first signal strength;
said second scheduler estimates a second signal strength within the second cell based on variations in the vertical sweep of the second beam, and performs a second scheduling function based on the estimated second signal strength;
a coordinating node which coordinates the vertical sweeps of the first and second beams emitted from the first and second base stations;
the first scheduler has knowledge of antenna tilt patterns in the second cell and utilizes the estimated first signal strength within the first cell and the knowledge of the antenna tilt patterns in the second cell to improve the first scheduling function; and
the second scheduler has knowledge of antenna tilt patterns in the first cell and utilizes the estimated second signal strength within the second cell and the knowledge of the antenna tilt patterns in the first cell to improve the second scheduling function.

5. A first base station in a wireless communication system which also includes a second base station, where the second base station has a second antenna system that vertically sweeps a second beam within a second cell, the first base station comprising:
a first scheduler;
a first antenna system that vertically sweeps a first beam within a first cell to improve a signal quality at scheduled times for a first user terminal located within a coverage area of the first cell; and
the first scheduler estimates a first signal strength within the first cell based on variations in the vertical sweep of the first beam;
the first scheduler performs a first scheduling function based on the estimated first signal strength;
the first scheduler dynamically monitors and learns the vertical sweeping of the second beam to determine instances when the signal strength is high and low within an edge of the second cell, where the vertical sweeping of the first beam and the second beam are uncoordinated between the first cell and the second cell;
the first scheduler utilizes the estimated first signal strength within the first cell and the learned instances when the signal strength is high and low within an edge of the second cell to find occurrences of both high desired signal levels and low interference levels in the first and second cells; and
the first scheduler utilizes the occurrences of both the high desired signal levels and low interference levels in the first and second cells in a semi-static or temporary manner to improve the first scheduling function.

6. A method implemented by a first base station in a wireless communication system which also includes a second base station, where the second base station has a second antenna system that vertically sweeps a second beam within a second cell, the method comprising the steps of:
- vertically sweeping a first beam within a first cell to improve a signal quality at scheduled times for a first user terminal located within a coverage area of the first cell;
- estimating a first signal strength within the first cell based on variations in the vertical sweep of the first beam,
- performing a first scheduling function based on the estimated first signal strength;
- dynamically monitoring and learning the vertical sweeping of the second beam to determine instances when the signal strength is high and low within an edge of the second cell, where the vertical sweeping of the first beam and the second beam are uncoordinated between the first cell and the second cell;
- utilizing the estimated first signal strength within the first cell and the learned instances when the signal strength is high and low within an edge of the second cell to find occurrences of both high desired signal levels and low interference levels in the first and second cells; and
- utilizing the occurrences of both the high desired signal levels and low interference levels in the first and second cells in a semi-static or temporary manner to improve the first scheduling function.

* * * * *